United States Patent
Takano et al.

(10) Patent No.: US 8,035,930 B2
(45) Date of Patent: Oct. 11, 2011

(54) PERPENDICULAR MAGNETIC RECORDING WRITE HEAD WITH A SIDE SHIELD

(75) Inventors: Kenichi Takano, Cupertino, CA (US); Lijie Guan, San Jose, CA (US); Yiu Liu, Fremont, CA (US); Joe Smyth, Aptos, CA (US); Moris Dovek, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 1029 days.

(21) Appl. No.: 11/906,717

(22) Filed: Oct. 3, 2007

(65) Prior Publication Data

US 2009/0091861 A1 Apr. 9, 2009

(51) Int. Cl.
*G11B 5/127* (2006.01)
(52) U.S. Cl. ........................................... 360/319
(58) Field of Classification Search .................. 360/122, 360/123.37, 123.58, 125.13, 125.14, 125.15, 360/319
See application file for complete search history.

(56) References Cited

U.S. PATENT DOCUMENTS

| 4,656,546 | A | 4/1987 | Mallory |
| 4,935,832 | A | 6/1990 | Das et al. |
| 6,954,340 | B2 | 10/2005 | Shukh et al. |
| 6,995,950 | B2 | 2/2006 | Lairson et al. |
| 7,002,775 | B2 * | 2/2006 | Hsu et al. ............ 360/125.03 |
| 7,715,152 | B2 * | 5/2010 | Okada et al. .................. 360/319 |
| 7,768,743 | B2 * | 8/2010 | Guthrie et al. .......... 360/125.13 |
| 7,770,281 | B2 * | 8/2010 | Pentek .................... 29/603.12 |
| 7,804,666 | B2 * | 9/2010 | Guan et al. ................. 360/319 |
| 7,872,835 | B2 * | 1/2011 | Guan ...................... 360/319 |
| 7,877,859 | B2 * | 2/2011 | Hsiao et al. .............. 29/603.13 |
| 7,894,159 | B2 * | 2/2011 | Lengsfield et al. ...... 360/125.03 |
| 2005/0068678 | A1 | 3/2005 | Hsu et al. |
| 2005/0141137 | A1 | 6/2005 | Okada et al. |
| 2006/0000794 | A1 | 1/2006 | Le |
| 2006/0044682 | A1 | 3/2006 | Le et al. |
| 2006/0082924 | A1 | 4/2006 | Etoh et al. |
| 2007/0146929 | A1 | 6/2007 | Maruyama et al. |

OTHER PUBLICATIONS

Co-pending U.S. Appl. No. 11/809,346, Filed May 31, 2007, "A Method to Make a Perpendicular Magnetic Recording Head with a Bottom Side Shield".
Co-pending U.S. Appl. No. 11/787,016, Filed Apr. 13, 2007, "A Composite Shield Structure of PMR Writer for High Track Density".
"One Terabit per Square Inch Perpendicular Recording Conceptual Design," by M. Mallary, IEEE Trans. on Magnetics, vol. 38, No. 4, Jul. 2002, pp. 1719-1724.

* cited by examiner

*Primary Examiner* — Angel A. Castro
(74) *Attorney, Agent, or Firm* — Saile Ackerman LLC; Stephen B. Ackerman

(57) ABSTRACT

A side shield structure for a PMR write head is disclosed that narrows write width and minimizes adjacent track and far track erasure. The side shield structure on each side of the write pole has two sections. One section along the ABS and adjacent to the pole tip has a height (SSH1) defined by SSH1≦[(0.6×neck height)+0.08] microns. There is a non-magnetic gap layer between the first section and a second section that is formed adjacent to the flared sides of the main pole layer and serves to suction leakage flux from the flared portion and prevent unwanted flux from reaching the first side shield sections. A fabrication method is provided that includes electroplating the first side shield sections, depositing the non-magnetic gap layer, and then electroplating the second side shield sections. Subsequently, a main pole layer and a trailing shield are formed.

9 Claims, 8 Drawing Sheets

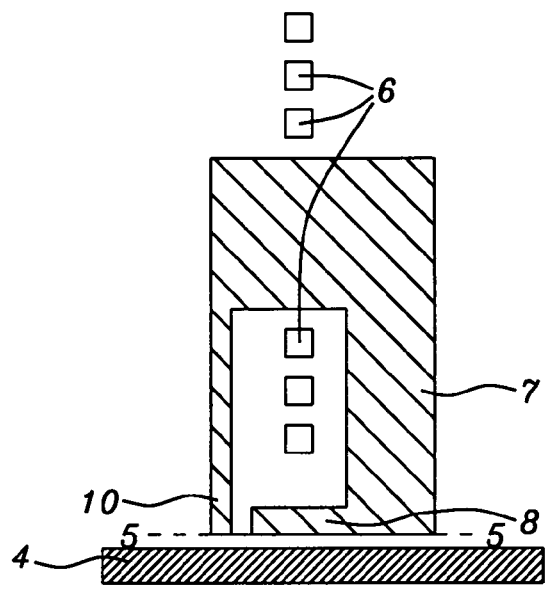
FIG. 1 – Prior Art
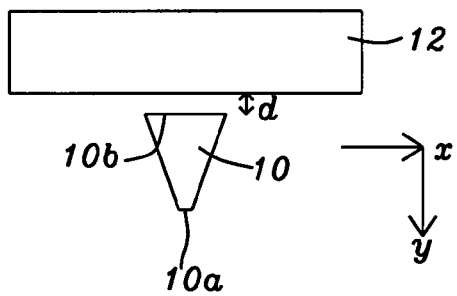
FIG. 2 – Prior Art
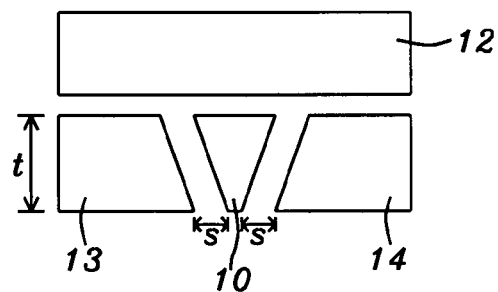
FIG. 3a – Prior Art

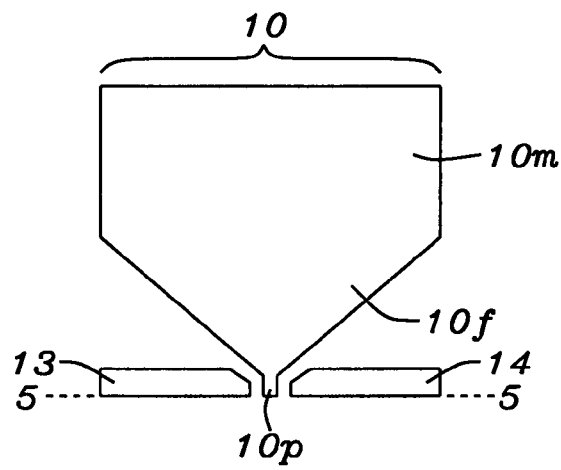
FIG. 3b – Prior Art
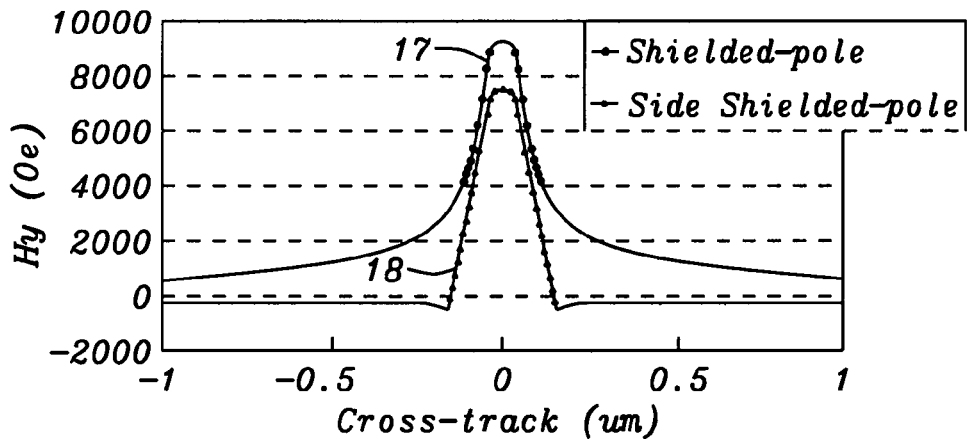
FIG. 4
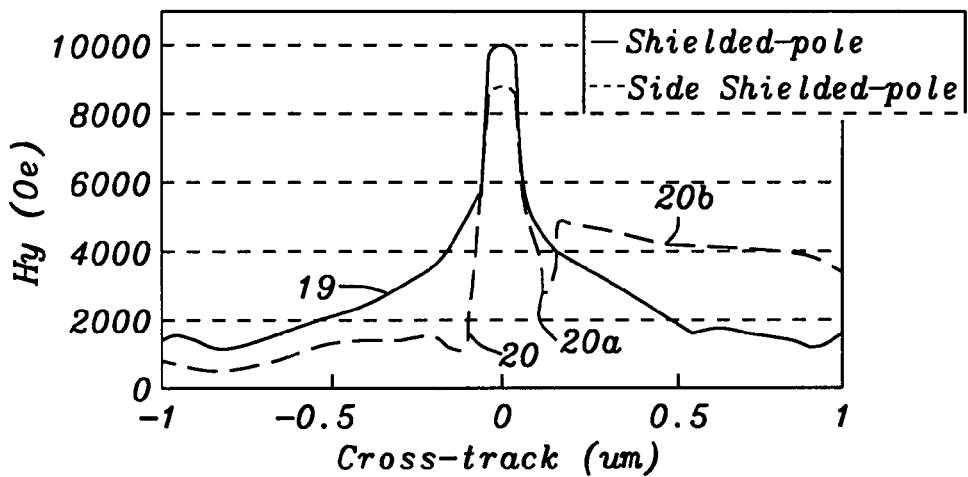
FIG. 5

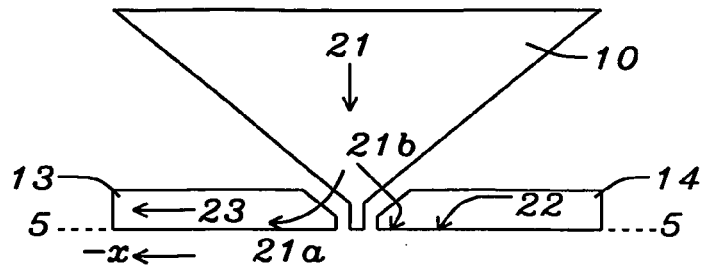
FIG. 6
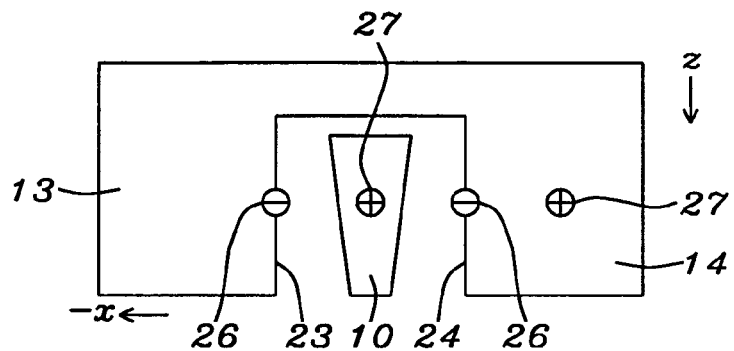
FIG. 7
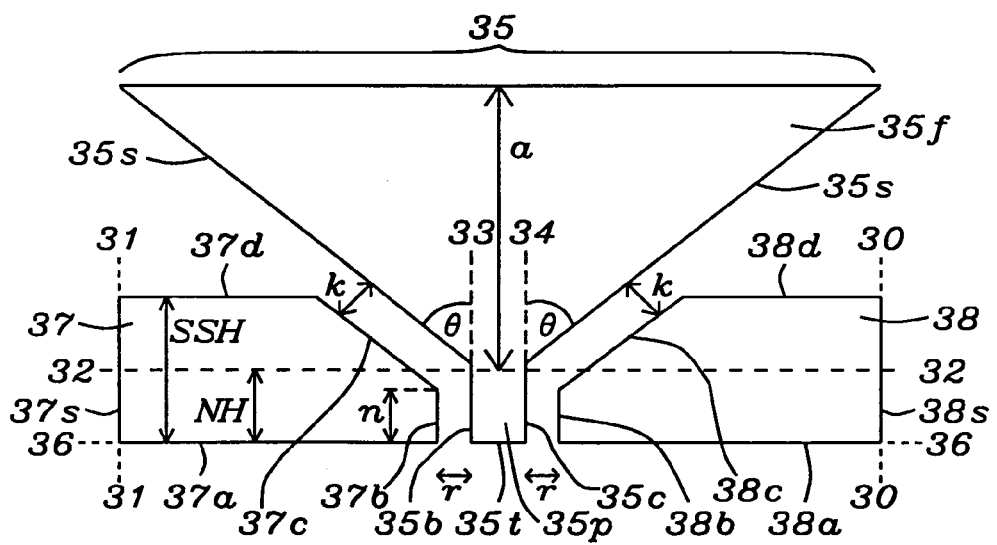
FIG. 8a  (NH < 0.2 μm)

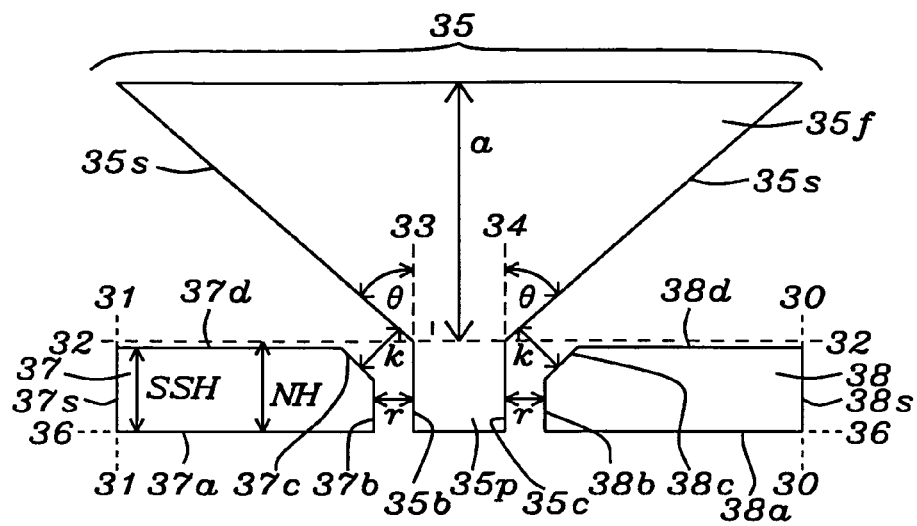
FIG. 8b  (NH > 0.2 μm)
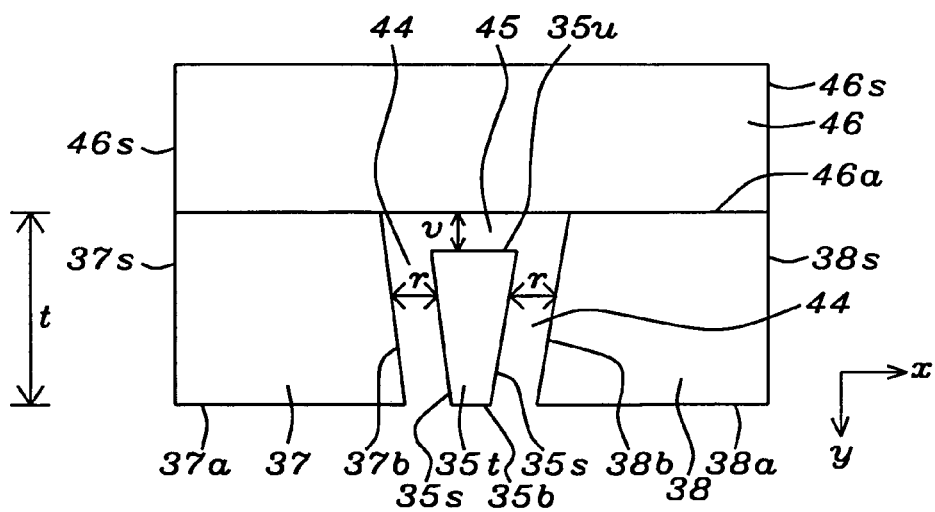
FIG. 9

PERPENDICULAR MAGNETIC RECORDING WRITE HEAD WITH A SIDE SHIELD

RELATED PATENT APPLICATIONS

This application is related to the following: U.S. Ser. No. 11/809346, filing date May. 31, 2007; and U.S. Ser. No. 11/787016, filing date Apr. 13, 2007; both assigned to a common assignee, and which are herein incorporated by reference in their entirety.

FIELD OF THE INVENTION

The invention relates to a side shield structure for a write pole in a perpendicular magnetic recording head that narrows the magnetic write width and minimizes adjacent track erasure, and a method for forming the same.

BACKGROUND OF THE INVENTION

Perpendicular magnetic recording (PMR) has been developed in part to achieve higher recording density than is realized with longitudinal magnetic recording (LMR) devices and is believed to be the successor of LMR for next generation magnetic data storage products and beyond. A single pole writer combined with a double layered recording media has the intrinsic advantage of delivering higher write field than LMR heads and enables a continuous increase in recording density required for advances in hard disk drive (HDD) technology. A conventional PMR write head as depicted in FIG. 1 typically has a main (write) pole 10 with a small surface area (pole tip) at an air bearing surface (ABS) 5 and a flux return pole (opposing pole) 8 which is magnetically coupled to the write pole through a trailing shield 7 and has a large surface area at the ABS. Magnetic flux in the write pole layer 10 is generated by coils 6 and passes through the pole tip into a magnetic recording media 4 and then back to the write head by entering the flux return pole 8. The write pole concentrates magnetic flux so that the magnetic field at the write pole tip at the ABS is high enough to switch magnetizations in the recording media 4.

To achieve high areal recording density with PMR technology, a key requirement for the PMR writer design is to provide large field magnitude and high field gradient in both down-track and cross-track directions. In practice, these two requirements are often traded off with each other to balance the overall performance. To improve the down-track field gradient, a trailing shield PMR writer design has been widely applied today. In FIG. 2, a view from the ABS plane is shown of a conventional trailing shield PMR writer in which a magnetic write shield 12 is placed above the top edge 10b of the write pole 10 by a certain distance d. The bottom or leading edge 10a of the write pole 10 is so designated because it is at the front of the write pole as it moves in the y or down-track direction. With this design, the down-track gradient is improved at the expense of reducing write field. In the cross-track or x direction, however, there is still a quite large detrimental fringe field (not shown) leading out from the write pole 10.

Referring to FIG. 3a, another prior art design is illustrated that was proposed by M. Mallary and described in "One Terabit per Square Inch Perpendicular Recording Conceptual Design", IEEE, Trans. Magn., Vol. 38, July, 2002. To further improve cross-track field gradient, a full side shield writer structure is used to limit the excessive fringe field onto the adjacent track. For example, the writer in FIG. 2 may be modified by adding one side shield 13 along one side of the write pole 10 and a second side shield 14 along the opposite side of the write pole. The side shields 13, 14 have a thickness t equal to the thickness of the write pole 10. Note that the side shields may have sloped sides that parallel the slope in the write pole sides and maintain a spacing or side gap s therebetween as viewed from the ABS. Depending on the size of side gap s, field magnitude could drop below the minimal performance requirement. FIG. 3b shows a down-track view of the PMR writer in FIG. 3a. The main pole layer 10 has a write pole 10p at the ABS 5-5, a main pole section 10m, and a flared section 10f that connects the write pole 10p and main pole section 10m.

Referring to FIG. 4, a finite element method (FEM) model shows a narrower head field width, sharper cross-track field gradient, and significantly smaller skirt field in the head profile 18 of a side shielded pole compared to the profile 17 of a trailing shielded pole. Based on this data, one can expect a very narrow track write width and much less adjacent track erasure in a side shielded head. However, most of the actual heads that feature side shields exhibit much poorer adjacent track erasure even though FEM models indicate less skirt in the head field profile. In addition, track erasure is not limited to adjacent tracks but can occur in tracks located several track widths away from the writing area. This phenomenon has been observed in many PMR writers with a side shielded configuration and appears to be a fatal flaw in a magnetic recording system.

Unfortunately, none of the prior art structures provide satisfactory control of field magnitude and field gradient in both the down-track and cross-track directions. Therefore, an improved write structure is necessary to achieve the high performance required for advanced devices with narrow track widths and high recording density. A routine search of the prior art revealed the following references. U.S. Pat. Nos. 4,656,546 and 4,935,832 discuss side shields to control fringing flux.

U.S. Pat. No. 6,954,340 describes a side shield PMR write structure wherein the distance between the ABS of the main pole and the bottom layer of a double layer recording medium is not more than two times shorter than the write gap distance between the main pole and a side shield.

U.S. Pat. No. 6,995,950 discloses reducing the flux gathering capacity of shields by reducing shield height but there are no specifics as to the height of the shield.

U.S. Patent Application No. 2005/0068678 shows side shields connected to a return pole piece on one side and to a trailing shield on an opposite side.

U.S. Patent Application No. 2006/0082924 describes a wrap-around shield where the height of the shield at the main pole side is greater than the height of the shield at the return pole.

U.S. Patent Application Nos. 2006/0000794 and 2006/0044682 disclose a trailing shield gap thickness which is different than a side shield gap thickness.

In U.S. Patent Application No. 2005/0141137, a trailing side shield has a thickness (Gd) equal to or less than the throat height near the main pole but Gd may be larger than the throat height in a portion of the shield that is a farther distance from the main pole to prevent the trailing shield from defoliating along the ABS.

U.S. Patent Application No. 2007/0146929 describes a main pole with a first flare adjacent to an air bearing surface and a second flare adjacent to the first flare but a greater distance from the ABS. There is a non-magnetic film between the first flare and a first magnetic layer along the ABS. The first magnetic layer provides shielding to prevent flux leakage to adjacent tracks. However, controlling the first flare thickness and second flare thickness could be a manufacturing issue.

SUMMARY OF THE INVENTION

One objective of the present invention is to provide a PMR writer structure that narrows the magnetic write width of the write pole during a writing operation.

Another objective of the present invention is to provide a PMR writer structure according to the first objective that minimizes adjacent track erasure and erasure in tracks not adjacent to the write track.

Yet another objective is to provide a method of fabricating the PMR writer structure according to the first two objectives.

According to the present invention, these objectives are achieved in a first embodiment wherein a main pole layer of a PMR write head is comprised of a narrow write pole section having a pole tip at one end along an ABS. The pole tip at the ABS has a leading or bottom edge, a top or trailing edge opposite the leading edge, and two sides that connect the leading and trailing edges. The top edge may have a greater width than the bottom edge and determines the track width. The other end of the narrow write pole section is attached to a front end portion of the main pole layer where the sides flare out at an angle θ relative to the sides of the narrow write pole section. Surrounding the narrow write pole section and a section of the flared portion of the main pole layer is a shield structure comprised of a side shield along each of the opposite sides of the narrow write pole section, and a trailing shield at a certain distance above the top edge. The side shields may adjoin the trailing shield or may be connected to the trailing shield by magnetic connections to ensure correct magnetic potential. An important feature is that the side shield height (SSH)≦[(0.6×neck height)+0.08] microns. The sides of the side shields that face the main pole layer are separated from the flared section and the narrow write pole section by a non-magnetic gap.

Viewed from the ABS plane, the trailing shield may have a rectangular shape with its longer sides formed parallel to the top (trailing) edge of the write pole tip. In one aspect, the side shields and the narrow write pole section with write pole tip have a first thickness along an axis that parallels the down-track direction. In a preferred embodiment, each of the side shields has a side facing the write pole that is essentially parallel to the nearest side of the write pole and spaced a certain distance (side gap distance) from said nearest side.

From a top view (down-track view), the main pole layer has a narrow write pole section containing the write pole tip at one end and a larger main pole layer section that flares outward from the end of the narrow write pole section that is opposite the pole tip. The main pole layer has a flared section to help the magnetic flux to concentrate at the pole tip and to counter balance the flux leakage loss to the side shields. Preferably, the side shields conform to the narrow write pole section and to a section of the flared portion of the main pole layer adjacent to the narrow write pole section. In other words, each partial side shield has a first side that is parallel to the narrow write pole section of the main pole layer and a second side connected to the first side that is parallel to a flared side of the main pole layer. A third side is formed along the ABS plane and a fourth side of a side shield may be perpendicular to the ABS plane and parallel to the first side.

In a second embodiment, the side shield structure is similar to the first embodiment except each side shield is divided into two sections that are separated by a non-magnetic gap layer that has a plane parallel to the ABS. Thus, a first section of each side shield has a side along the ABS and an end that faces the narrow write pole section, and is separated from the narrow write pole section by a first non-magnetic gap layer. A side of the first section opposite the ABS adjoins a second non-magnetic gap layer. The thickness of the first section SSH1 is defined by the equation SSH1≦[(0.6×NH)+0.08] microns. There is a second section of each side shield that has an end parallel to the flared portion of the main pole layer and has a side formed facing the side of the first section that is opposite the ABS. The second section draws leakage flux from the flared portion of the main pole layer and thereby prevents flux from entering the first section that is nearer the magnetic recording medium. The two piece side shield is preferred because it generates less fringing field in the head profile and can eliminate adjacent track and far track erasure problems.

In a preferred method of fabrication of a two piece side shield, a Ru stopper layer is deposited on a dielectric layer that serves as a separation layer between a read head and the subsequently formed PMR write head. A first side shield section is plated along the ABS with an opening to allow for the deposition of a narrow write pole section in a later step. An alumina non-magnetic gap layer is formed on the first side shield section and on the Ru stopper layer followed by deposition of a second side shield section on a portion of the non-magnetic gap layer adjacent to the first side shield section. Thereafter, a second alumina layer is deposited on the non-magnetic gap layer and fills the opening. A CMP step is employed to make the second alumina layer coplanar with the first and second side shield sections. Next, a Ru masking layer is formed on the second alumina layer and over the side shield followed by a photoresist patterning and etching sequence to form an opening in the Ru mask that corresponds to the desired main pole layer shape. The opening in the Ru mask is transferred through the second alumina layer to form a cavity that serves as a mold for a later main pole layer deposition step. A third alumina layer is then deposited on the Ru mask layer and on the sidewalls of the cavity. The main pole layer is then deposited to fill the cavity and a second CMP process is used to remove a portion of the third alumina layer above the Ru mask. An alumina write gap layer is deposited on the main pole layer that defines an opening for the subsequent formation of coils, a resist insulator surrounding the coils, a top yoke on the write shield and insulator, and finally, an alumina overcoat layer on the device.

BRIEF DESCRIPTION OF THE DRAWINGS

FIG. 1 is a top view of a conventional PMR writer showing the main write pole, flux return pole, magnetic recording media, and coils that generate magnetic flux.

FIG. 2 is a cross-sectional view from an ABS plane showing a conventional PMR write head that has a trailing shield above a write pole.

FIG. 3a is a cross-sectional view from an ABS plane that shows a prior art PMR writer design having a full side shield in addition to a trailing shield.

FIG. 3b is a down-track view of the main pole layer in FIG. 3a that shows a write pole portion and flared portion of the main pole layer.

FIG. 4 is a graph that depicts FEM calculation data of head field cross-track profiles for trailing shielded pole and side shielded pole with trailing shield configurations.

FIG. 5 is a graph illustrating micromagnetic calculation data of head field cross-track profiles for the trailing shielded pole and side shielded pole with trailing shield configurations in FIG. 4.

FIG. 6 is a cross-sectional view of a side shielded pole from a down-track position showing the magnetization distribution around the main pole and side shields during a writing state as determined by micromagnetic calculations.

FIG. 7 is a cross-sectional view from the ABS plane showing the magnetic charge arrangement at the ABS during a writing state in a side shielded pole configuration.

FIG. 8a and FIG. 8b are top views (down-track views) of a PMR writer with a one piece side shielded structure in which NH<SSH and NH>SSH, respectively, according to a first embodiment of the present invention.

FIG. 9 is a cross-sectional view from the ABS showing the PMR writer structure in FIG. 8.

DETAILED DESCRIPTION OF THE INVENTION

Figure 10:
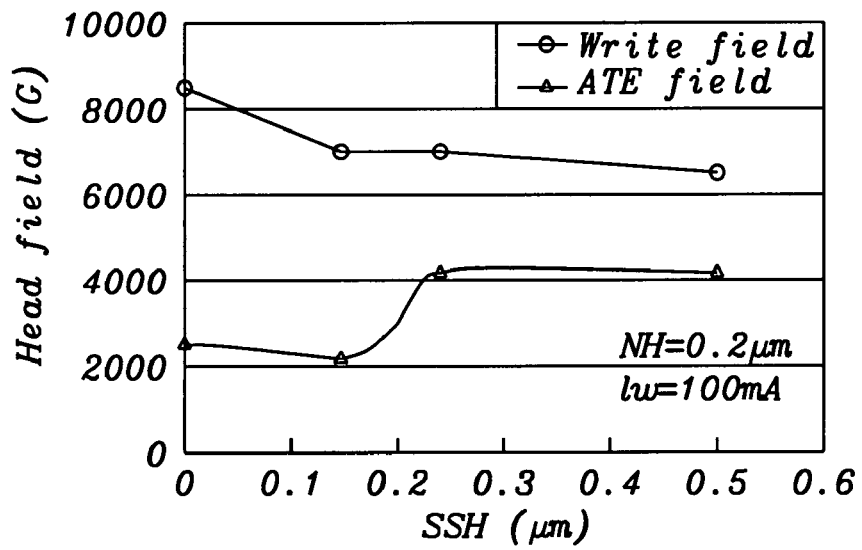
FIG. 10 is a graph illustrating the maximum write field and adjacent track fringing field at the 0.5 microns off-track position in a side shielded pole head as a function of the side shield height.

The present invention is a PMR writer having a main pole layer with a narrow write pole section, also referred to as a write pole, at an ABS wherein the write pole has a shield structure comprising a trailing shield above the top surface of the write pole, and a side shield on opposite sides of the write pole that is designed to narrow the write field and minimize adjacent track and far track erasure. The drawings are provided by way of example and are not intended to limit the scope of the invention. Moreover, the elements in the figures are not necessarily drawn to scale and may have different relative sizes in an actual device. The present invention also encompasses a method of fabricating the preferred embodiment.

In order to improve the design of a side shield structure for a PMR write head, we applied a full micromagnetic model by Landau-Lifshitz-Gilbert equation solving through a parallel computation method that takes into account the complicated magnetization behavior associated with a main pole and side shield configuration. Referring to FIG. 5, micromagnetic calculation results are shown in the form of a head field profile 19 for a main pole with trailing shield, and a head field profile 20 for a main pole with side shields and a trailing shield using DC writing. The side shielded pole head has a large side fringing field 20b from about 0.2 to 1.0 micron cross-track positions on one side after a dip 20a of the side shield edge. The head profile 20 of a side shielded pole is very different than that of the FEM result (side shield profile 18) shown in FIG. 4.

The large side fringing field 20b is understood according to the following explanation based on the calculation results. Referring to FIG. 6, magnetic flux 21 in the main pole 10 leaks to both side shields 13, 14, via magnetic flux 21a, 21b, respectively, from the flared portion of the main pole 10 and thereby magnetizes both side shields. The left side shield 13 can absorb the magnetic flux 21a without any adverse consequences because the flux 21a direction is parallel to the original magnetization of the side shield 13 which is in the negative "x" direction. Therefore, the resulting magnetization 23 is parallel to the ABS 5-5 and a leakage field is not observed in the left side shield 13. Furthermore, the skirt field is very clean. On the other hand, in the right side shield 14, the original magnetization direction is in the negative "x" direction but is anti-parallel to the leakage flux 21b. The opposing magnetizations result in a magnetization 22 which tilts toward the ABS 5-5 and leaks from the side shield 14 into the adjacent recording medium (not shown) to produce the large side fringing field 20b (FIG. 6).

Referring to FIG. 7, the magnetic charge arrangement in the side shields 13, 14 and in main pole 10 is shown at the ABS and is derived from the full micromagnetic model using Landau-Lifshitz-Gilbert equation solving. The fringing field polarity of side shield 14 is the same as in the main pole 10 as indicated by a positive sign 27 while the sides 23, 24 of side shields 13, 14, respectively, that face the main pole 10 have a negative charge 26. This unique feature can be confirmed in experiments. For example, on DC erased media, DC writing with opposite polarity is performed several times. Thereafter, the wide range cross-track profile as shown in FIG. 6 is reproduced. Many of the side shielded pole heads in the prior art show far track writing on one side, meaning that the side shielded pole heads have a large fringing field on one side of the head field skirt.

According to the present invention, a side shield design for a PMR write head is disclosed that reduces the fringing field in the head field profile and provides a narrow magnetic write width necessary for high density recording applications. Referring to FIG. 8a, the inventors have considered a PMR write head as shown from a top view with the trailing shield removed and comprised of a main pole layer 35 that has a flared portion 35f and a write pole 35p with a surface (pole tip 35t) at an ABS 36-36. The main pole layer 35 is formed on a substrate (not shown) that may be a separation layer made of $Al_2O_3$ between a read head and a write head in a separated PMR read-write head, for example. However, the PMR writer is not limited to a separated PMR read-write head and may encompass other PMR writer configurations as appreciated by those skilled in the art. The trailing shield (not shown) is connected to side shields 37, 38 along the ABS.

In FIG. 9, the PMR writer structure in FIG. 8a is depicted as viewed from the ABS plane 36-36. The pole tip 35t has an upper surface 35u which has a greater length along the x-axis than a bottom surface 35b. Note that the upper surface 35u corresponds to the trailing side when the PMR writer is moving in a y-direction during a write operation. There are two sides 35s which connect the upper surface and the bottom surface 35b to form an inverted trapezoidal shape. The side shields 37, 38 are adjacent to a non-magnetic gap layer 44 and are positioned along the two sides 35s at a distance r from the pole tip 35t. Side shield 37 has a side 37b facing the nearest side 35s, a side 37s opposite side 37b, and a side 37a along the ABS. A fourth side opposite side 37a may adjoin the trailing shield 46. Likewise, side shield 38 has a side 38b facing the nearest side 35s, a side 38s opposite side 38b, and a side 38a along the ABS. Preferably, the sides 37b, 38b are parallel to the nearest side 35s. However, sides 37b, 38b may be formed parallel to sides 37s, 38s, respectively, and perpendicular to trailing shield 46.

In one embodiment, side shields 37, 38 are connected to a trailing shield 46 that has a side 46a which is parallel to upper surface 35u and is separated from the upper surface by a write gap layer 45 with a thickness v which is preferably 0.03 to 0.10 microns. The side shields 37, 38 have a thickness t along a y-axis direction and t is preferably greater than the thickness of the write pole tip 35t. Furthermore, the trailing shield 46 may have a rectangular shape with two sides 46s that are coplanar with the sides 37s, 38s of the side shields 37, 38, respectively. The thickness of the write pole tip 35t is defined as the distance between the upper surface 35u and bottom surface 35b along a line that is parallel to the y-axis, and is about 0.15 to 0.30 microns. The length of the top surface 35u along the ABS (x-axis direction) is defined as the track width and is typically in the range of 0.05 to 0.20 microns.

Returning to FIG. 8a, the flared portion 35f of the main pole layer 35 has flared sides 35s connected to an end of the write pole 35p along the plane 32-32. The sides 35s are aligned at an angle θ with respect to planes 33-33, 34-34 which are extensions of sides 35b, 35c, respectively. The flared portion 35f extends a distance a of about 1.0 to 4.0 microns from the plane 32-32 and adjoins the back end (not shown) of the main pole layer 35. The main pole layer 35 may be deposited by an electroplating method as described in a later section and may be comprised of CoNiFe or FeCo that has a high saturation magnetic flux density (Bs) and a plated thickness of about 0.1 to 0.3 microns, for example.

Side shields 37, 38 are further comprised of sides 37b, 38b, respectively that have an end at the ABS 36-36 and extend a distance n in a direction parallel to the sides 35b, 35c of the write pole 35p. The magnitude of n is preferably equal or less than the neck height NH which is the distance between the ABS 36-36 and the plane 32-32 which lies along the end of the write pole 35p opposite the ABS. The distance r between side 37b and side 35b and between side 38b and side 35c is also known as the side gap spacing and is comprised of a non-magnetic gap layer 44. The side shield height (SSH) is the distance between the ABS 36-36 and a side (37d or 38d) opposite the ABS for side shields 37, 38, respectively.

There is also a side 37c in side shield 37 which has an end connected to the end of side 37b opposite the ABS and which is aligned parallel to a side 35s and separated from the parallel side 35s by a certain non-magnetic gap distance k. Similarly, side shield 38 has a side 38c which has an end connected to the end of side 38b opposite the ABS and which is aligned parallel to a side 35s and separated from the parallel side by a certain non-magnetic gap distance k. Sides 38s, 37s lie along the planes 30-30 and 31-31, respectively, and are typically formed by a CMP process as appreciated by those skilled in the art.

In one embodiment, the main pole layer 35, trailing shield 46, and side shields 37, 38 may be made of CoFeNi, CoFe, NiFe or other soft magnetic materials such as a material based on Co and that is amorphous. One fabrication sequence for forming the aforementioned magnetic elements is provided in related Headway application HT06-017 which is herein incorporated by reference in its entirety. The non-magnetic write gap (WG) layer 44 (FIG. 8a) may be made of $Al_2O_3$, silicon oxide, or NiCu, for example. A fabrication sequence for forming a two piece side shield section will be provided in a separate section following a description of a second embodiment of the present invention.

A key feature in the first embodiment is that SSH≦[(0.6× NH)+0.08] microns which is hereafter referred to as equation 1. Equation 1 allows for SSH to be slightly greater than NH (when NH<0.2 microns), equal to NH, or less than NH (when NH>0.2 microns). FIG. 8a represents an example where SSH is greater than NH. Preferably, SSH is less than NH as illustrated in FIG. 8b since the fringing field is generally minimized when this condition exists. The ATE field has been determined for various NH and SSH lengths as indicated in FIG. 10 and in general, the ATE field is suppressed by keeping the SSH value smaller than the NH value.

Figure 11:
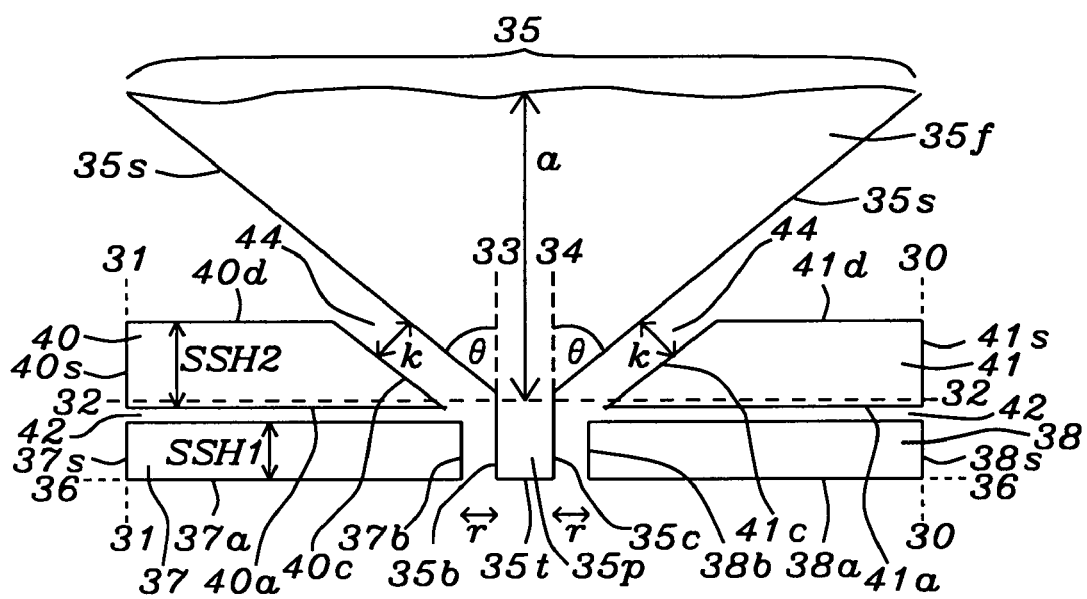
FIG. 11 is a down-track view of a PMR writer with a two piece side shield structure according to a second embodiment of the present invention.

Referring to FIG. 11, a second embodiment is illustrated that is preferred over the first embodiment. The side shield structure shown in FIG. 8a is modified by inserting a first non-magnetic gap layer 42 between a first side shield section 37 (38) adjacent to the ABS 36-36 and a second side shield section 40 (41) formed adjacent to a flare portion 35f of the main pole layer 35. Preferably, the first non-magnetic gap layer 42 is formed along a plane that is parallel to the ABS layer 36-36 and is formed between the ABS and the plane 32-32 where a front end of the flared portion 35f adjoins the write pole 35p. The thickness of the first non-magnetic gap layer 42 is defined as the shortest distance between first side shield section 37 and second side shield section 40 or between first side shield section 38 and second side shield section 41 which is preferably 0.05 to 0.3 microns.

There is a second non-magnetic gap layer 44 between the sides 35s of the main pole layer 35 and sides 40c, 41c, respectively of second side shield sections 40, 41. The second non-magnetic gap layer 44 is also formed between sides 35b, 35c of the write pole 35 and sides 37b, 38b, respectively of first side shield sections 37, 38. The first non-magnetic gap layer 42 and second non-magnetic gap layer 44 may be made of alumina or another dielectric material.

In the exemplary embodiment, the first side shield sections 37, 38 have an essentially rectangular shape with a long side 37a, 38a, respectively, along the ABS 36-36 and short sides 37s, 37b, 38s, 38b formed perpendicular to the ABS. The first side shield section height SSH1 is defined by equation 1 in order to minimize the side fringing field and preferably has a magnitude less than NH. Second side shield sections 40, 41 have a first side 40a, 41a, respectively, that is a distance equal to SSH1 and the thickness of the first gap layer 42 from the ABS 36-36. Second sides 40s, 41s are formed coplanar with sides 37s, 38s, respectively. Third sides 40c, 41c respectively, of second side shield sections 40, 41 are formed parallel to sides 35s of the main pole layer and are separated from the flared portion 35f of the main pole layer by a second gap distance k that may be greater than r which represents a first gap distance. For example, r may have a value between 0.05 and 0.3 microns while k has a value between 0.1 and 0.5 microns. There is a fourth side of each second side shield section 40, 41 that is parallel to side 40a, 41a, respectively. Second side shield height SSH2 is the distance between first side 40a (41a) and fourth side 40d (41d). Total side shield height is defined as SSH1+SSH2+the thickness of the first non-magnetic gap layer 42.

The angle θ in the flared portion 35f is preferably between 30 degrees and 60 degrees to help concentrate the magnetic flux from the main pole layer at the pole tip 35t and to counter balance the flux leakage loss to the second side shield sections 40, 41. However, without the side shield structure described herein, the large flare angle θ would cause too much fringe field at the adjacent track. The process flow during fabrication is simplified by making the second side shield sections 40, 41 conformal with the flared sides 35s of the main pole layer 35.

The two piece side shield configuration is advantageously designed so that the first side shield sections 37, 38 have a SSH1 dimension to minimize side fringing fields in the adjacent track and far track positions while the second side shield sections 40, 41 serve to suction leakage flux from the flare portion 35f and thereby prevent unwanted flux from reaching the first side shield sections 37, 38.

Figure 12:
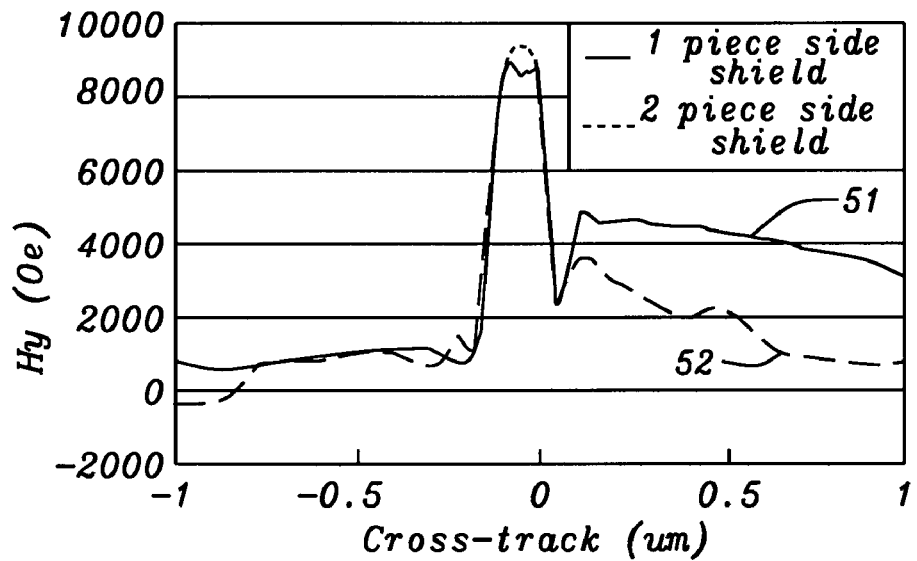
FIG. 12 is a graph depicting the head field cross-track profiles of a one piece side shielded pole structure and a two piece side shielded pole structure.

The benefit of a two piece side shield as described herein is demonstrated in FIG. 12 where head field cross-track profiles are shown for a one piece shield (curve 51) and for a two piece shield. (curve 52). Total side shield height in both designs is 0.5 microns. On the one side where adjacent track and far track erasure is a primary concern for a one piece side shield, the two piece side shield of the present invention is able to reduce the fringing field by about 50%. Note that the maximum write field at the 0 micron cross-track position is essentially the same in both cases. Thus, a two piece side shield is disclosed herein that has a narrow magnetic write width without significantly compromising the maximum write field of a conventional one piece side shield design. Furthermore, the 2 piece side shield design minimizes adjacent track and far track erasure because of a substantial reduction in fringing field.

Figure 13A:
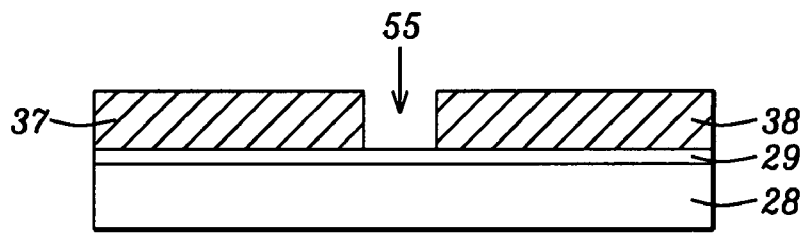
FIGS. 13a-13b are an ABS view and a cross-sectional view, respectively, that depict a first step during the fabrication of a two piece side shield section according to one embodiment of the present invention.

Referring to FIG. 13a, an ABS view shows the first steps in a process sequence for forming the second embodiment of the present invention. A separation layer 28 made of a dielectric material such as alumina is provided on a substrate (not shown) that may be a second shield layer in a read head as understood by those skilled in the art. An etch stop layer 29 made of Ru, for example, is deposited on the separation layer 28 by a chemical vapor deposition (CVD) method or the like. Next, the first side shield sections 37, 38 are formed by a conventional electroplating process and are separated by an opening 55 that allows placement of a main pole layer in a later process step.

Figure 13B:
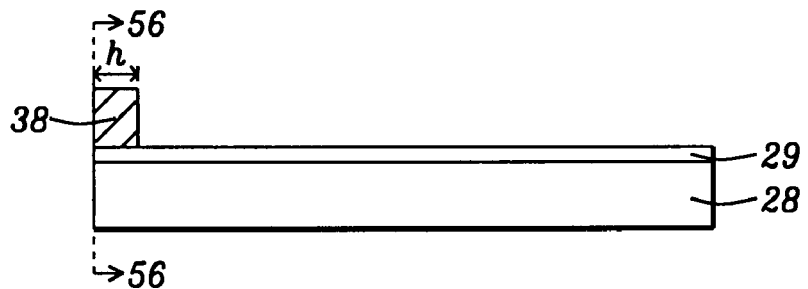

In FIG. 13b, a cross-sectional view of the structure in FIG. 13a is shown and depicts a side shield section 38 formed along a plane 56-56 (essentially parallel to the eventual ABS) and extending a distance h toward the back end of the PMR write head. It should be understood that the distance h is greater than SSH1 since a lapping process is employed at the end of the fabrication sequence to remove a portion of the PMR write head including portions of first side shield sections 37, 38 adjacent to plane 56-56 and thereby form an ABS between plane 56-56 and second shield sections 40, 41 (FIG. 14).

Figure 14:
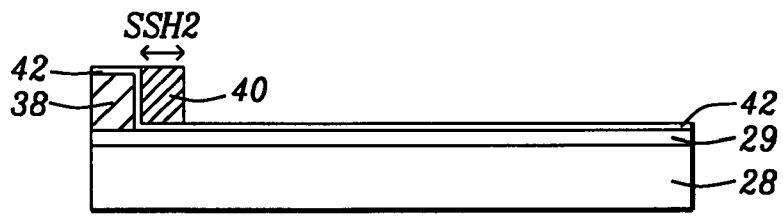
FIG. 14 is a cross-sectional view of the structure in FIG. 13b after a non-magnetic gap layer and a second side shield section are sequentially formed adjacent to the first side shield section.

Referring to FIG. 14, a non-magnetic gap layer 42 made of alumina, for example, is then deposited on the etch stop layer 29 and first side shield section 38 (and 37). Next, second side shield section 40 (and 41) are simultaneously electroplated on the non-magnetic gap layer 42 adjacent to first side shield sections 37, 38, respectively. The second side shield sections 40, 41 extend a distance SSH2 from the non-magnetic gap layer 42 in a direction away from the plane 56-56. From a top-view (not shown), there is a larger opening between second side shield sections 40 and 41 than the opening 55 between first side shield sections 37, 38 in order to provide sufficient room to deposit the flared portion of the main pole layer in a later process step.

Figure 15:
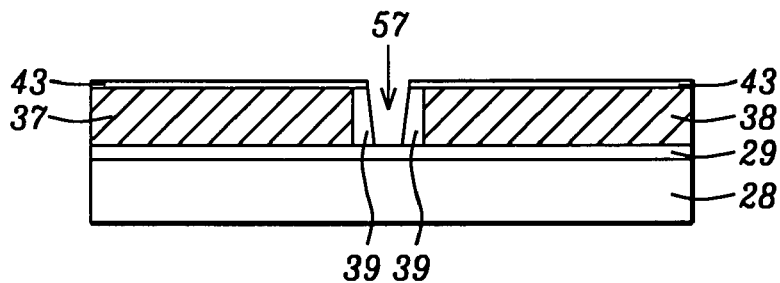
FIG. 15 is a view from the ABS during the fabrication sequence after a cavity is formed in a second alumina layer that is coplanar with the two side shield sections shown in FIG. 14.

Referring to FIG. 15, a first dielectric layer 39 that may be made of alumina is deposited on the non-magnetic gap layer 42, first side shield sections 37, 38, second side shield sections 40, 41 (not shown), and on the etch stop layer 29 along the ABS followed by a chemical mechanical process (CMP) step to make the first dielectric layer 39 coplanar with the first side shield sections 37, 38. Next, an etch masking layer 43 that is preferably Ru is formed on the first side shield sections 37, 38, second side shield sections 40, 41, and over the first dielectric layer 39. A photoresist patterning step is used to form an opening 57 within the etch masking layer 43 that corresponds to the shape of the desired main pole layer. Then an etching process is employed as appreciated by those skilled in the art to transfer the opening 57 through the first dielectric layer 39 to form a mold for the main pole layer.

Figure 16:
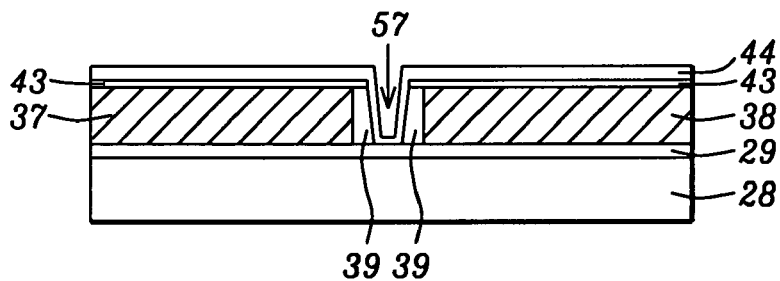
FIG. 16 is a view from the ABS after a third alumina layer is deposited on the structure shown in FIG. 15.

In FIG. 16, a second dielectric layer 44 that may also be made of alumina is deposited by a CVD process or the like on the etch masking layer 43 and along the sidewalls in opening 57 to form a conformal film.

Figure 17:
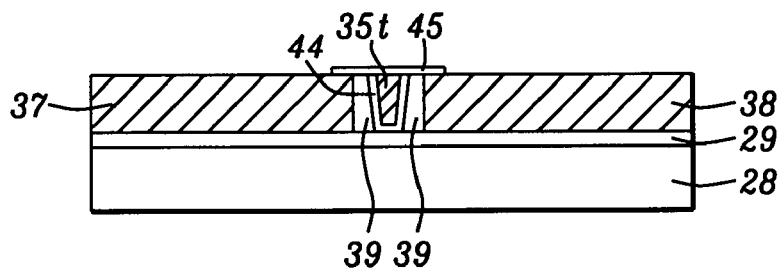
FIG. 17 is a view from the ABS following deposition of a main pole layer on the third alumina layer, a CMP step, and formation of a write gap layer on the main pole layer.

Referring to FIG. 17, a main pole layer with a pole tip 35t is electroplated in opening 57 (FIG. 16). It should be understood that a seed layer (not shown) may be deposited in the opening prior to the electroplating process to facilitate the main pole layer deposition. Then a CMP process is performed to remove the etch masking layer 43 and the overlying portion of the second dielectric layer 44. In the following step, a write gap layer 45 preferably made of alumina is deposited and then patterned to cover the main pole layer including pole tip 35t. The write gap layer preferably has a thickness from 0.03 to 0.1 microns. It should be understood that the first dielectric layer 39 and second dielectric layer 44 along the ABS may also be covered by the write gap layer 45.

Figure 18A:
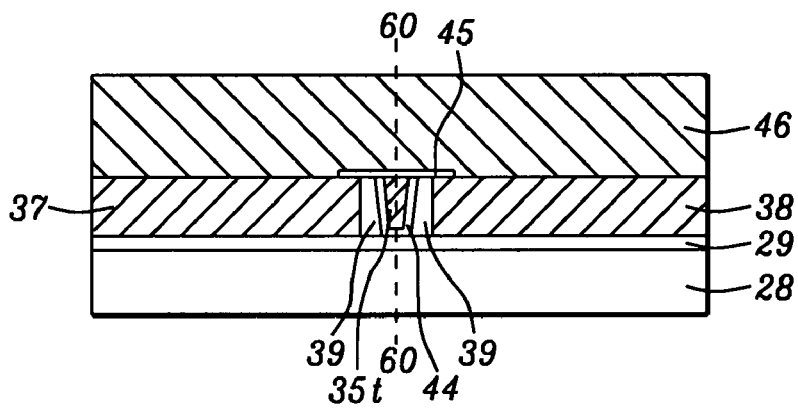
FIGS. 18a-18b are an ABS view and a cross-sectional view, respectively, that depict the structure in FIG. 17 after a write shield is plated on the write gap layer.
Figure 18B:
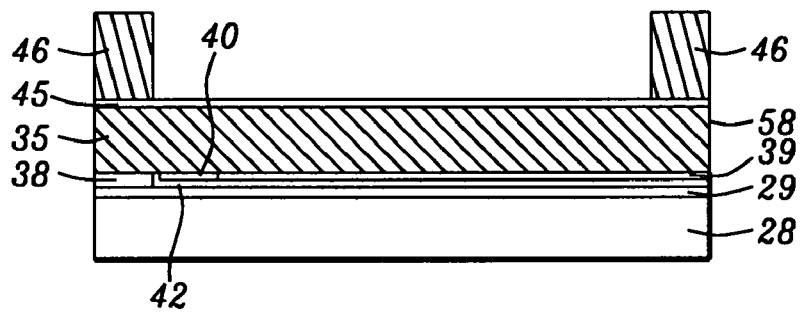

Referring to FIG. 18a, a view from the ABS is shown after a write shield also known as trailing shield 46 is electroplated on the write gap layer 45, first side shield sections 37, 38 and second side shield sections 40, 41 along the ABS. FIG. 18b is a cross-sectional view of the structure in FIG. 18a along the plane 60-60 and shows that the trailing shield 46 is also formed on a portion of the write gap layer 45 near the back end 58 of the PMR writer. The trailing shield 46 may be comprised of the same magnetic material such as CoFeNi, CoFe, or NiFe as in the main pole layer.

Figure 19:
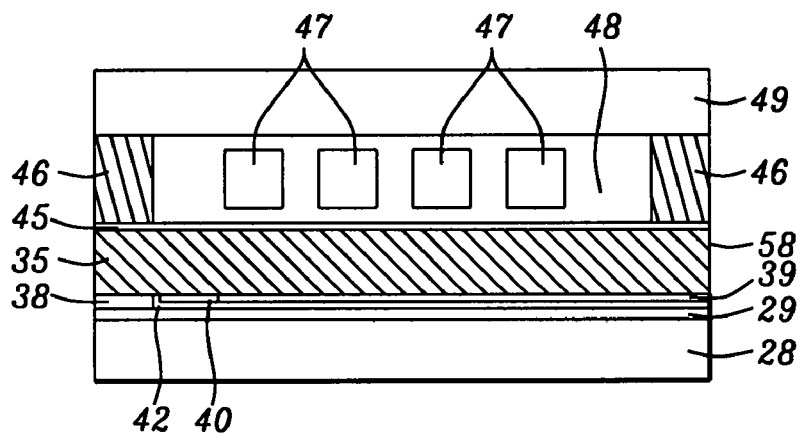
FIG. 19 is a cross-sectional view of the structure in FIG. 18b following formation of coils, an insulator surrounding the coils, a top yoke, and an alumina overcoat.

Referring to FIG. 19, the partially formed PMR writer in FIG. 18b is completed by sequential formation of coils 47, a resist insulator 48, a top yoke 49, and an alumina overcoat (not shown). The fabrication sequence is readily implemented into a manufacturing scheme because there is only an additional step of adding a second side shield section to the existing process flow.

While this invention has been particularly shown and described with reference to, the preferred embodiment thereof, it will be understood by those skilled in the art that various changes in form and details may be made without departing from the spirit and scope of this invention.

We claim:

1. A side shield structure in a perpendicular magnetic recording (PMR) write head having a main pole layer with a write pole having top and bottom surfaces terminating at a pole tip at an air bearing surface (ABS) wherein said write pole is further comprised of two sides that each connect to a side of a flared portion of the main pole layer at a neck height (NH) distance from the ABS, comprising:

(a) a first side shield section formed on either side of the write pole, said first side shield section has a first side along the ABS, a second side connected to the first side and facing a side of the write pole, a third side formed perpendicular to the ABS and at a greater distance from the write pole than the second side, and a fourth side opposite the first side;

(b) a first non-magnetic gap layer with a certain thickness and having a top surface and bottom surface which are formed along planes that are parallel to the ABS, said bottom surface adjoins the fourth side of a first side shield section and said top surface adjoins a first side of a second side shield section on either side of the write pole;

(c) a second non-magnetic gap layer that is formed along either side of the write pole and flared portion of the main pole layer, said second non-magnetic gap layer provides a first gap distance between a side of the write pole and a second side of the first side shield section, and provides a second gap distance between the sides of the flared portion and the second shield section; and (d) a second side shield section formed on either side of the flared portion of the main pole layer, said second side shield section has a first side parallel to the ABS and contacts the first non-magnetic gap layer, a second side formed parallel to a side of the flared portion of the main pole layer, a third side coplanar with a third side of the first side shield section, and a fourth side opposite the first side of the second side shield section.

2. The side shield structure of claim 1 wherein the first side shield section has a height which is the distance between the first and fourth sides, said first side shield height (SSH1) is defined by the equation $SSH1<[(0.6\times NH)+0.08]$ microns.

3. The side shield structure of claim 1 wherein the main pole layer, first side shield section, and second side shield section are comprised of CoFe, CoFeNi, NiFe, or a material that is Co based and amorphous.

4. The side shield structure of claim 1 wherein the first gap distance is from about 0.05 to 0.3 microns.

5. The side shield structure of claim 1 wherein the second gap distance is from about 0.1 to 0.5 microns.

6. The side shield structure of claim 1 wherein the first non-magnetic gap layer has a thickness between about 0.05 and 0.3 microns.

7. The side shield structure of claim 1 wherein the first non-magnetic gap layer and second non-magnetic gap layer are comprised of alumina or another dielectric material.

8. The side shield structure of claim 1 wherein a first side shield section on one side of the write pole is magnetically connected to a first side shield section on the other side of the write pole by a trailing shield formed along the ABS.

9. The side shield structure of claim 8 wherein the trailing shield is separated from the top surface of the write pole by a write gap layer.

* * * * *